United States Patent [19]
Steiger

[11] 3,744,380
[45] July 10, 1973

[54] PISTON MACHINE HAVING RADIALLY DISPOSED PISTONS

[75] Inventor: Anton Steiger, Illnau, Switzerland

[73] Assignee: Sulzer Brothers Ltd., Winterthur, Switzerland

[22] Filed: Sept. 27, 1971

[21] Appl. No.: 184,159

[30] Foreign Application Priority Data
Oct. 7, 1970  Switzerland.................... 14763/70

[52] U.S. Cl.................... 92/61, 91/488, 308/5, 308/122, 417/273
[51] Int. Cl............................................ F01b 1/02
[58] Field of Search.................. 92/61; 417/273; 91/488; 308/9; 308/122

[56] References Cited
UNITED STATES PATENTS

| 3,685,874 | 8/1972 | Gerard | 308/9 |
| 2,347,663 | 5/1944 | Carnahan | 417/273 X |
| 3,208,395 | 9/1965 | Budzich | 91/488 X |
| 3,354,786 | 11/1967 | Bedford | 91/488 X |
| 3,613,510 | 10/1971 | Chambers | 417/273 X |
| 3,650,180 | 3/1972 | Gantschnigg et al. | 91/488 |
| 3,650,580 | 3/1972 | Beisemann | 308/9 |

FOREIGN PATENTS OR APPLICATIONS

| 230,421 | 6/1959 | Australia | 273/ |

Primary Examiner—Martin P. Schwadron
Assistant Examiner—A. Hershkovitz
Attorney—Kenyon & Kenyon Reilly Carr & Chapin

[57] ABSTRACT

Hydrostatic bearings are provided between the pistons and block of a size to substantially balance the axial hydraulic forces on the pistons. Similar bearings are provided between the eccentric and block, and the shaft journals and housing. These hydrostatic bearings are sized and interconnected together to equalize the static forces between the shaft and block and between the shaft and housing. The various bearings can be interconnected by external pipes or by internal ducts in the shaft.

9 Claims, 8 Drawing Figures

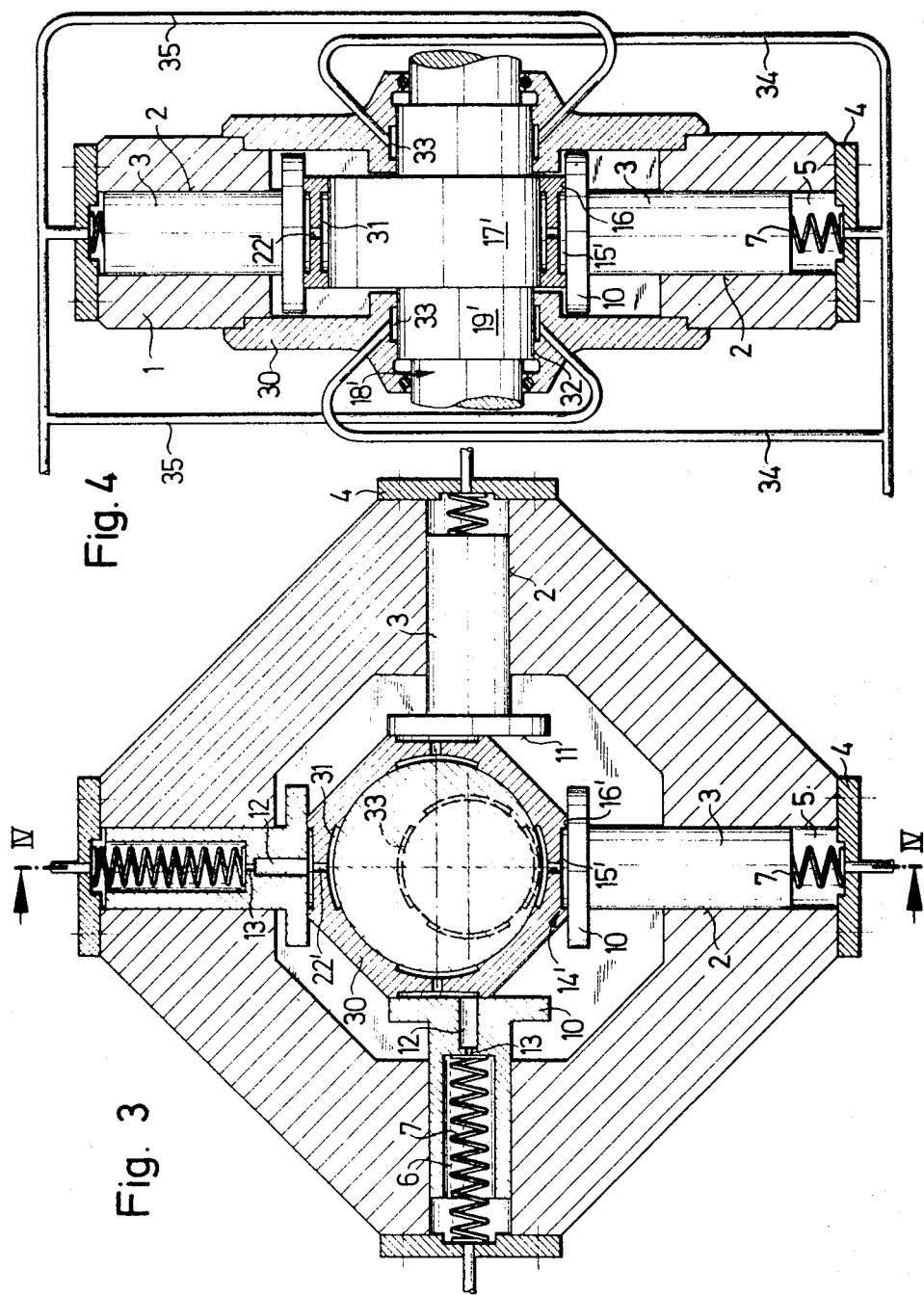

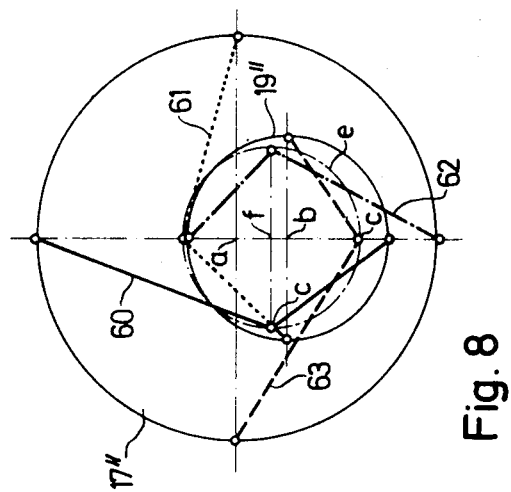
Fig. 8
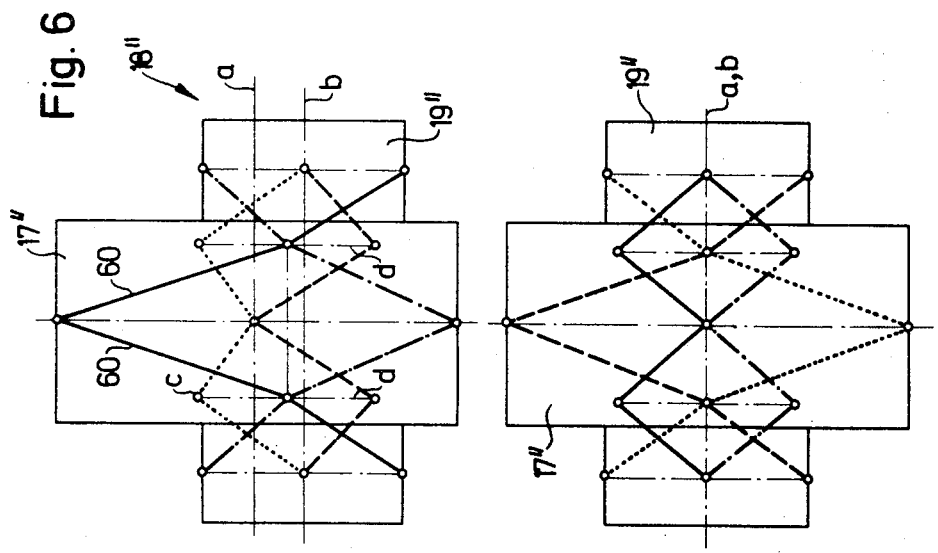
Fig. 6
Fig. 7

PISTON MACHINE HAVING RADIALLY DISPOSED PISTONS

This invention relates to piston machines with radially disposed pistons and, particularly, to machines arranged to operate as motors or as pumps and to machines capable of operating either as motors or pumps.

According to the invention, a piston machine having radially disposed pistons which have flat bearing surfaces arranged perpendicularly to their axes to cooperate with flat abutment surfaces on a block carried by an eccentric or crankpin, is provided with a pocket in each abutment surface of the block opposite the piston bearing surface. Each pocket is surrounded by a sealing rim to form a hydrostatic bearing and is of an area which is, at most, equal to the effective piston area of the piston. Each of the pistons also has a duct which opens on to the bearing surface of the piston facing the block and connects the cylinder chamber of the piston with the associated pocket in the block. The opposite sides of each piston are thus exposed to substantially equal hydraulic forces during operation so as to balance the piston.

The provisions of a hydrostatic bearing between the pistons and the block allows losses in the engine to be kept low and minimizes wear.

Hydrostatic bearings are also provided between the block and an eccentric or crankpin or crankshaft carrying the support element. Also, the eccentric or crankpin may be carried by a shaft having journals mounted in journal bearings which are afforded with hydrostatic bearing means.

In one embodiment, the hydrostatic bearings associated with the shaft and eccentric are interconnected by external pipes to equalize the static forces on the shaft during operation.

In another embodiment, the hydrostatic bearings are interconnected by means of internal ducts within the shaft to equalize the static forces on the shaft.

These and other objects and advantages of the invention will become more apparent from the following detailed description and appended claims taken in conjunction with the accompanying drawings in which:

FIG. 3 illustrates a view similar to FIG. 1 of another machine according to the invention;

FIG. 4 illustrates a view taken on line IV—IV of FIG. 3 with the connecting pipes drawn in;

FIGS. 6 to 8 illustrate various schematic view of a shaft as shown in FIG. 3 with internal ducts to replace the external pipes shown in FIGS. 4 and 5.

Figure 1:
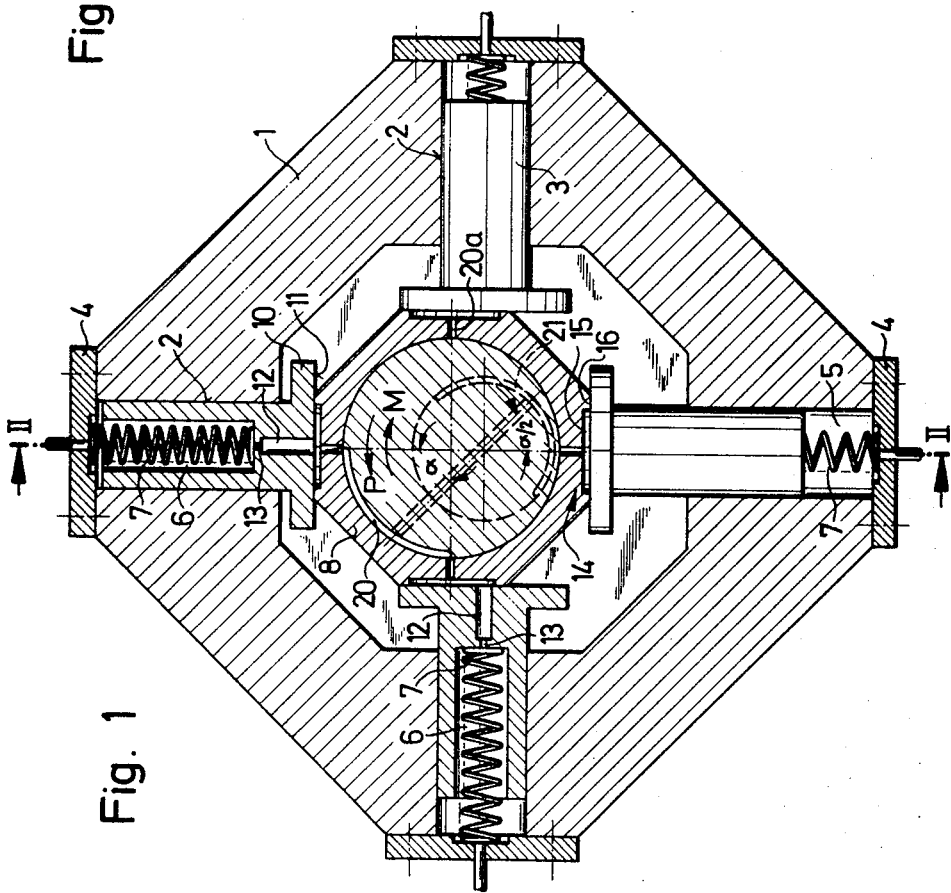
FIG. 1 illustrates a sectional view taken on the axes of the pistons of a piston machine according to the invention.

Referring to FIG. 1, a piston machine is constructed with a cylinder block 1 which contains radially directed cylinders 2 in which pistons 3 are slidably mounted in a fluid-tight manner. Each cylinder 2 is covered over at the exterior of the block 1 by cover plates 4 which are suitably secured to the block 1 in sealed manner so that cylinder chambers 5 are formed in the cylinders 2 between the ends of pistons 3 and the plates 4. A suitable liquid, for example, hydraulic fluid, can be supplied to and discharged from the cylinder chambers 5 through flow control means (not shown) so that the machine is able to operate either as a motor or as a pump. Each piston 3 is formed with a bore 6 in which a spring 7 is mounted to urge the piston 3 radially inward onto a block 8. Alternatively, the springs 7 can be omitted where the pistons are urged onto the block 8 by hydraulic force or by mechanical connections.

The inner end of each piston 3 is provided with a flange 10 on which a flat bearing surface 11 perpendicular to the piston axis is formed. Each piston 3 is also provided with a bore 12, which contains a constriction 13 and connects the adjacent cylinder chamber 5 via the bore 6 to the center of the bearing surface 11. That is, the mouth of the bore 12 is coaxial with the piston.

The block 8 is provided with flat abutment surfaces 14 each of which contains a pocket 15 surrounded by a sealing rim 16 to form a hydrostatic bearing. The block 8 is rotatably mounted via an internal cylindrical bearing surface on an external cylindrical bearing surface of an eccentric 17 fixed on a shaft 18 to carry out an oscillatory movement during which the abutment surfaces 14 always take up parallel positions. Alternatively, the eccentric 17 can be replaced by a crankpin or a crankshaft. The width of the pockets 15 in the block 8 in the plane of the drawing (FIG. 1) and the position of the bores 12 in the pistons 3 are selected so that the bores 12 do not leave the pockets 15. There is, therefore, always a connection between each pocket 15 and the associated cylinder chamber 5.

The effective areas of the pockets 15 are such that the forces acting on the pistons 3 practically cancel out. Theoretically, therefore, the effective area of each pocket 15 should be equal to the effective piston area of the piston 3 which is exposed to the pressure of the liquid in the cylinder chamber 5 and takes part in the generation of an axial force acting on the piston 3. In practice, however, the area of the pocket 15 will be somewhat smaller, since the sealing rim 16 also takes part in the generation of a bearing force. Also, a slight contact pressure between the piston 3 and block 8 is desirable.

Under these conditions, the pressure produced in the pockets 15 during operation substantially compensates for the hydraulic force exerted on the piston 3 in the cylinder chamber 5 and results in the piston 3 floating on a layer of liquid, e.g., hydraulic fluid, in the axial direction. This not only reduces friction on the surfaces of the piston 3, but also keeps abrasion of the surfaces of the pistons 3 and block 8 to a minimum.

Figure 2:
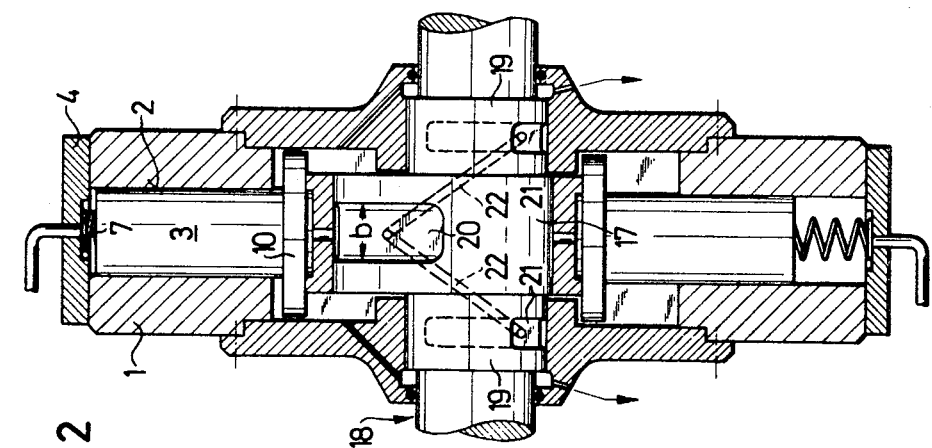
FIG. 2 illustrates a view taken on line II—II of FIG. 1.

Referring to FIGS. 1 and 2, the shaft 18, which comprises journals 19 as well as the eccentric 17, is also provided with pockets 20, 21 to form hydrostatic bearings. One pocket 20 is formed in the external cylindrical bearing surface of the eccentric 17 and, as shown in FIG. 1, begins at the top dead-center of the eccentric 17 and extends over an angle $\alpha$. This pocket 20 is connected by bores 20a through the block 8 to at least one of the pockets 15. The size of the angle $\alpha$ in degrees theoretically required to compensate the forces depends on the number of cylinders $n$ in the engine and can be calculated by means of the following formula:

$$\alpha° = \pm\, 180/n\, [(n-1) - \tfrac{1}{2}\, [\,1 + (-1)^n\,]\,]. \tag{I}$$

The actual size of the angle can be varied from this value, of course, to allow for dynamic conditions. Similarly, the beginning of the pocket 20 need not lie exactly at the upper dead-center of the shaft 18, i.e., at the point of maximum throw of the eccentric.

The width $b$ of the pocket 20, that is, its extent in the axial direction of the shaft 18, is selected so that the theoretical value for the resulting projected area of the pocket 20 is as follows:

$$F_T = 2 F_K [ A + \cos. (B \cdot 180/n) ]$$

wherein:
$A = 0$ if : $n = 3$ or 4
$A = \frac{1}{2}$ if : $n = 5$ or 6
$A = \cos (180/n)$ if : $n = 7$ or 8
$n$ = the number of cylinders 2, i.e., pistons 3,
$F_T$ = the projected area of the pocket 20 in the eccentric 17;
$F_K$ = the effective piston area of a piston 3, and
$B = \frac{1}{2} [(n - 2) + \frac{1}{2} [ 1 + ( - 1) n+1 ] ]$.

In practice, of course, the value for the projected area of the pocket 20 may be made somewhat smaller, as already mentioned with reference to the pockets 15.

The journals 19 of the shaft 18 are provided with pockets 21 which are permanently connected by bores 22 to the pocket 20 in the eccentric 17. Theoretically, the pockets 21 extend 180° around the circumference, as shown in FIG. 1, the centers being at an angle, as measured from the bottom dead-center, i.e., the point of minimum throw, having a value $\alpha/2$ if, in accordance with equation I, $\alpha$ is the circumferential angle of the pocket 20. The width of the pockets 21, that is, their extent in the axial direction of the shaft 18, is selected so that the bearing forces generated at the side of the pockets 21 balance the force generated at the side of the pocket 20. Where the two journals 19 are on different sides of the eccentric 17 and the pockets 21 are equidistant from the eccentric 17, the widths of the two pockets 21 are equal and the effective areas of the two associated pockets 21 are equal in size to the effective area of the pocket 20.

During operation, the static forces arising in the pockets 20 and 21 are equal, as considered in radial directions, to the forces exerted on the shaft 18 by the pistons 3 operative at the time. As a result, there is no metal contact between the shaft 18 and the adjacent components, that is, the bearings in the housing 1 and the block 8. Clearly, the eccentric position of the pockets 15 in the block 8 relative to the shaft 18 gives rise to a torque which must be supplied from an external shaft if the engine is operating as a pump or can be taken off the engine in the form of work if operating as a motor.

Arrow P and M in FIG. 1 indicate the direction of rotation of the shaft 18 when the engine is operating as a pump (P) and as a motor (M).

Figure 5:
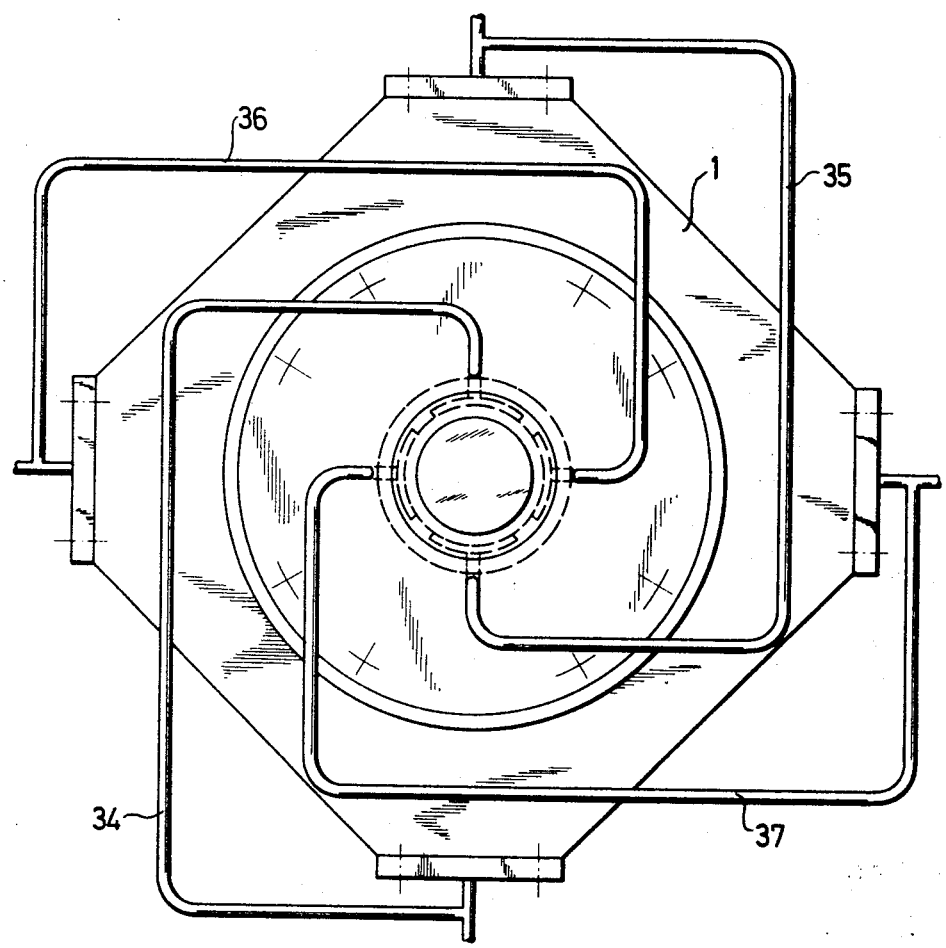
FIG. 5 illustrates an elevational view of the machine shown in FIGS. 3 and 4.

Referring to FIGS. 3 to 5, wherein like reference characters indicate like parts as above, a piston machine gives the same hydrostatic bearing effect as the machine shown in FIGS. 1 and 2, has an arrangement of lubricating pockets which does not depend on the direction of rotation of the machine (arrows P and M in FIG. 1). The machine differs from that shown in FIGS. 1 and 2 only in that pockets 31 are provided on the internal bearing surface of the block 30 and on the bearings 32 for the shaft journals 19'. All the other components of the engine are the same.

In addition, the block 30 has pockets 15' with sealing rims 16' in the abutment surfaces 14' which are connected by radial bores 22' to the internal pockets 31. The effective area of the pockets 31 is selected so that the force generated thereby is substantially equal to the force at the pockets 15'. Normally this means that the projection of the area of the pocket 31 in the axial direction of the associated piston is equal to that of the corresponding pocket 15'.

The bearings 32 for the journals 19' of the shaft 18' are provided with pockets 33 of which the centers, or the centers of pressure of the effective areas, are situated in radial planes passing through the axes of the cylinders 2. The size of the pockets 33 is such that the forces arising therein can be cancelled out by forces arising at the pockets 31. Normally, therefore, the effective area of two associated pockets 33 is equal to that of the corresponding pocket 31.

In order to give the desired effect of mutual compensation of the forces acting on the shaft 18', the pockets 31, 33 are connected to the cylinder chambers 5 of the associated cylinders by suitable lines. For example, two lines 34 connect the cylinder chamber 5 for the bottom piston, as viewed in FIGS. 4 and 5, to the diametrically opposite pockets 33 in the bearings 32. Similarly, lines 35 to 37 each connect one cylinder chamber 5 to the diametrically opposite pockets 33 in the bearings 32.

During operation, forces which are generated in the bearing pockets 33 through the connections by way of the lines 34 to 37, cancel out the forces exerted on the shaft 18' in the pockets 31. As a result, the load on the shaft 18' is relieved and all metal contact is prevented.

Finally, referring to FIGS. 6 to 8, the lines connecting the mutually associated pockets 31 and 33 can alternatively be formed in the shaft 18''. The external lines 34 to 37 can, therefore, be omitted. However, since all the places to be interconnected are diagonally opposite one another, the connecting ducts cannot run straight, or they will intersect one another and make the desired method of operation impossible. Therefore, each connecting duct in the shaft 18'' comprises two bores which are at an angle to one another and intersect one another at points spaced from the axes $a$, $b$ of the eccentric 17'' and of the journals 19''. For example, for a machine position as shown in FIG. 3, two ducts 60, each comprising two straight bores, connect the pocket 31 at the top dead-center of the eccentric 17'' in the block 30 to two diametrically opposite pockets 33 in the bearings 32. Other ducts 61, 62 and 63 connect mutually associated places on the outside surfaces of the eccentric 17'' and journals 19''. For clarity's sake, the ducts 60 to 63 are represented in FIGS. 6 to 8 by different lines, i.e., solid, broken dotted, and chain, respectively.

As shown in FIGS. 6, 7 and 8, the points $c$ of intersection between the straight bores of the ducts are situated in planes $d$ which are perpendicular to the axes $a$ and $b$ and are between the mouths of the ducts 60 to 63. Also, the points $c$ of intersection are situated on a circle $e$ whose center $f$ is between the two axes $a$ and $b$ of the eccentric 17'' and journals 19''. In addition, every two points $c$ of intersection of the bores are preferably in a plane which runs parallel to the axes $a$, $b$ of the eccentric 17'' and of the journals 19'', but which is offset by 90° relative to the plane containing the mouths of the bores concerned.

What is claimed is:
1. A piston machine comprising a plurality of radially disposed pistons, each piston having a longitudinal axis, a flat bearing surface thereon perpendicular to said axis thereof, a cylinder chamber therein on a side opposite said bearing surface thereof and a duct communicating said bearing surface with said cylinder chamber;

a block having flat abutment surfaces thereon each facing a respective bearing surface of a respective piston, a pocket in each said abutment surface and a sealing rim surrounding each respective pocket, said pocket having an area at most equal to the effective piston area of said respective piston and communicating with said duct therein;

an eccentric mounting said block thereon; and said eccentric having an external bearing surface and said block having an internal cylindrical bearing surface slidably mounted on said external bearing surface, said external bearing surface on said eccentric having a pocket and said block having bores connecting said pockets in said abutment surfaces of said block to said internal cylindrical bearing surface on said block whereby said pocket in said external surface of said eccentric is positioned such that forces produced by pressurized fluid admitted to said pocket in said external bearing surface through said bores at least partially balances the radial forces exerted on said eccentric by said block.

2. A piston machine as set forth in claim 1 wherein said pocket in said eccentric begins at the point of maximum throw thereof and extends in the rotational direction of said eccentric approximately through an angle ($\alpha$) given by the formula:

$$\alpha° = \pm\ 180/n\ [(n-1) - \tfrac{1}{2}\ [1 + (-1)n\ ]\ ],$$

and has a width ($b$) selected so that the resulting area ($F_T$) is approximately in accordance with the formula:

$$F_T = 2\ F_K\ [A + \cos(B \cdot 180/n)\ ]$$

wherein:
$A = 0$ if : $n = 3$ or $4$
$A = \tfrac{1}{2}$ if : $n = 5$ or $6$
$A = \cos(180/n)$ if : $n = 7$ or $8$
$n =$ the number of said pistons,
$F_T =$ the area of projection of said pocket in said eccentric,
$F_K =$ the effective piston area of a respective piston, and:

$$B = \tfrac{1}{2}\ [(n-2) + \tfrac{1}{2}\ [1 + (-1)n+1\ ]\ ]$$

3. A piston machine as set forth in claim 2 which further comprises a shaft carrying said eccentric and having journals thereon, and pockets in each said journal of an effective extension of 180°, with a center at an angle measured from the point of minimum throw equal to half the circumferential extension of said pocket in said eccentric, and of a width such that the sum of the resulting effective areas of said pockets in said journals is equal to the effective area of said pocket in said eccentric.

4. A piston machine comprising a plurality of radially disposed pistons, each piston having a longitudinal axis, a flat bearing surface thereon perpendicular to said axis thereof, a cylinder chamber therein on a side opposite said bearing surface thereof and a duct communicating said bearing surface with said cylinder chamber;

a block having flat abutment surfaces thereon each facing a respective bearing surface of a respective piston, a pocket in each said abutment surface and a sealing rim surrounding each respective pocket, said pocket having an area at most equal to the effective piston area of said respective piston and communicating with said duct therein;

an eccentric mounting said block thereon; and said eccentric and said block having cooperating external and internal cylindrical bearing surfaces respectively, said internal surfaces of said block having a pocket corresponding to each of said pockets in said abutment surfaces of said block, and ducts interconnecting corresponding pockets having approximately the same effective areas and having centers of pressure approximately in the same plane containing the axis of said eccentric.

5. A piston machine as set forth in claim 4 further comprising a shaft carrying said eccentric, said shaft having journals; journal bearings having bearing surfaces, and pockets in said latter bearing surfaces corresponding to a diametrically opposite to said pockets in said block, each pocket in said block having corresponding pockets in said journal bearings of approximately the same effective area; and ducts connecting said pockets corresponding to each pocket in said block to each other and to each said cylinder chamber associated with said pocket in said block.

6. A piston machine as set forth in claim 5 wherein said ducts are formed in said eccentric and said shaft.

7. A piston machine as set forth in claim 6 wherein each duct comprises a pair of bores having a point of intersection spaced from the axes of said eccentric and of said journals.

8. A piston machine as set forth in claim 7 wherein said points of intersection of all the pairs of said bores relating to each journal are situated on a circle having a plane perpendicular to the axis of said eccentric and disposed between planes containing the mouths of said ducts in said eccentric and said journal respectively, the center of said circle being situated in a plane common to the axes of said eccentric and of said journal and between said eccentric and said journal.

9. A piston machine as set forth in claim 8 wherein every two points of intersection of said bores are situated in a plane parallel to the axes of said eccentric and of said journals and offset by 90° relative to said plane containing said mouths of said associated bores.

* * * * *